(12) United States Patent
Futagi

(10) Patent No.: US 11,293,447 B2
(45) Date of Patent: Apr. 5, 2022

(54) TURBO-MOLECULAR PUMP BLADE DESIGN

(71) Applicant: SHIMADZU CORPORATION, Kyoto (JP)

(72) Inventor: Keiichi Futagi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 354 days.

(21) Appl. No.: 16/731,158

(22) Filed: Dec. 31, 2019

(65) Prior Publication Data
US 2020/0240421 A1 Jul. 30, 2020

(30) Foreign Application Priority Data

Jan. 30, 2019 (JP) .............................. JP2019-014470

(51) Int. Cl.
| | |
|---|---|
| *F04D 19/04* | (2006.01) |
| *F04D 29/54* | (2006.01) |
| *F04D 17/16* | (2006.01) |
| *F04D 29/32* | (2006.01) |

(52) U.S. Cl.
CPC ......... *F04D 19/042* (2013.01); *F04D 19/046* (2013.01); *F04D 17/168* (2013.01); *F04D 29/324* (2013.01); *F04D 29/544* (2013.01); *F16C 2360/45* (2013.01)

(58) Field of Classification Search
CPC .... F04D 19/042; F04D 19/046; F04D 17/168; F04D 29/324; F04D 29/544; F16C 2360/45
See application file for complete search history.

(56) References Cited

U.S. PATENT DOCUMENTS

| | | | | |
|---|---|---|---|---|
| 3,826,588 | A | * | 7/1974 | Frank ................. F04D 19/042 415/90 |
| 5,033,936 | A | * | 7/1991 | Shinojima ............ F01D 5/02 415/90 |
| 2002/0021968 | A1 | * | 2/2002 | Olhofer ................ F04D 29/544 416/223 R |

FOREIGN PATENT DOCUMENTS

| | | |
|---|---|---|
| JP | 58197497 A | 11/1983 |
| JP | 58202396 A | 11/1983 |
| JP | 60116897 A | 6/1985 |
| JP | 61247894 A | 11/1986 |
| JP | 2000-110771 A | 4/2000 |

OTHER PUBLICATIONS

Office Action for corresponding CN Office Action Application No. 2020100173241 dated Nov. 26, 2020, with English language translation.

* cited by examiner

*Primary Examiner* — Bryan M Lettman

(74) *Attorney, Agent, or Firm* — Renner, Otto, Boisselle & Sklar, LLP

(57) ABSTRACT

A turbo molecular pump including multiple stages. At least one of the multiple stages of the rotor blades and the multiple stages of the stator blades is configured to satisfy any one of a first condition of Xout<Xc and Xin<Xc, a second condition of $\alpha \cdot Xc \geq Xin > Xc > Xout$ where $\alpha = 1.04$, or a third condition of $Xin < Xc < Xout \leq \beta \cdot Xc$ where $\beta = 1.04$.
Xout, Xc and Xin being an inter-blade distance dived by a blade length, at an outer-diameter-side end portion, at an inner-diameter-side portion, and at an intermediate position of each blade, respectively.

9 Claims, 17 Drawing Sheets

Fig.4A

REFERENCE BLADE (OPTIMIZATION FOR ARGON)

| BLADE TYPE | BLADE ANGLE (deg) (INNER DIAMETER SIDE) | BLADE ANGLE (deg) (OUTER DIAMETER SIDE) | BLADE NUMBER |
|---|---|---|---|
| SUCTION STAGE | 50 | 30 | 16 |
| INTERMEDIATE STAGE | 50 | 30 | 36 |
| EXHAUST STAGE | 20 | 15 | 34 |

Fig.4B

BLADE OF EMBODIMENT (OPTIMIZATION FOR HYDROGEN)

| BLADE TYPE | BLADE ANGLE (deg) (INNER DIAMETER SIDE) | BLADE ANGLE (deg) (OUTER DIAMETER SIDE) | BLADE NUMBER |
|---|---|---|---|
| SUCTION STAGE | 43 | 23 | 14 |
| INTERMEDIATE STAGE | 50 | 30 | 38 |
| EXHAUST STAGE | 23 | 15 | 38 |

Fig. 5

| BLADE TYPE | INNER DIAMETER SIDE Xin | AVERAGE Xc | OUTER DIAMETER SIDE Xout |
|---|---|---|---|
| SUCTION STAGE | 0.925 | 1.25 | 1.24 |
| INTERMEDIATE STAGE | 0.960 | 1.18 | 1.19 |
| EXHAUST STAGE | 1.06 | 1.12 | 1.04 |

Fig. 7

BLADE NUMBER OF 38

| | INNER-DIAMETER-SIDE BLADE ANGLE [deg] | | | | | | |
|---|---|---|---|---|---|---|---|
| OUTER-DIAMETER-SIDE BLADE ANGLE [deg] | 19 | 20 | 21 | 22 | 23 | 24 | 25 |
| 12 | | | | | | | |
| 13 | | | 3.2~8.8 | 1.7~8.8 | 1.3~7.7 | | |
| 14 | | 2.4~8.5 | | 3.1~9.0 | F 2.2~8.6 | | |
| 15 | | | | 4.2~8.5 | A 3.1~8.1 | D 3.2~8.0 | I 3.0~6.7 |
| 16 | | | | 3.0~7.7 | B 3.6~7.0 | C 3.3~7.7 | |
| 17 | | | | 2.8~6.4 | G 2.5~5.9 | E 3.1~7.2 | J 2.6~6.1 |
| 18 | | | | | 1.6~4.3 | H 2.6~5.2 | K 2.5~5.3 |

DIFFICULT TO PROCESS ↓

|  | Pr (max) | Qv (max) |
|---|---|---|
| ◇ REFERENCE BLADE | 2.44 | 1.01 |
| □ OPTIMAL SOLUTION | 2.60 | 0.99 |

|  | Pr (max) | Qv (max) |
|---|---|---|
| ◇ REFERENCE BLADE | 2.85 | 1.09 |
| □ OPTIMAL SOLUTION | 3.12 | 1.06 |

Fig. 10

| BLADE TYPE | INNER DIAMETER SIDE Xin | AVERAGE Xc | OUTER DIAMETER SIDE Xout |
|---|---|---|---|
| OPTIMAL SOLUTION | 1.06 | 1.12 | 1.04 |
| OPTIMAL SOLUTION CANDIDATE A | 1.06 | 1.08 | 0.938 |
| OPTIMAL SOLUTION CANDIDATE B | 1.06 | 1.15 | 1.14 |
| OPTIMAL SOLUTION CANDIDATE C | 1.12 | 1.16 | 1.04 |
| OPTIMAL SOLUTION CANDIDATE D | 1.12 | 1.12 | 0.938 |
| OPTIMAL SOLUTION CANDIDATE E | 1.12 | 1.21 | 1.14 |
| SUB-CANDIDATE F | 1.06 | 1.03 | 0.839 |
| SUB-CANDIDATE G | 1.06 | 1.20 | 1.23 |
| SUB-CANDIDATE H | 1.12 | 1.24 | 1.23 |
| SUB-CANDIDATE I | 1.19 | 1.20 | 1.04 |
| SUB-CANDIDATE J | 1.19 | 1.24 | 1.14 |
| SUB-CANDIDATE K | 1.19 | 1.28 | 1.23 |
| REFERENCE BLADE | 1.03 | 1.17 | 1.22 |

Fig. 14

|  | H$_2$ (100sccm) | H$_2$ (300sccm) |
|---|---|---|
| SUCTION STAGE | 4.0~4.6% | 4.2~8.5% |
| INTERMEDIATE STAGE | 3.4~5.7% | 2.5~5.8% |
| EXHAUST STAGE | 1.7~4.6% | 3.5~8.2% |

Fig. 15

| H₂ GAS FLOW RATE | PERFORMANCE IMPROVEMENT RATE |
|---|---|
| 100sccm | 16.0% |
| 200sccm | 24.6% |
| 300sccm | 19.3% |

Fig. 16

| | Ar (500sccm) |
|---|---|
| SUCTION STAGE | 3.3~7.5% |
| INTERMEDIATE STAGE | 3.4~11.5% |
| EXHAUST STAGE | 2.7~3.4% |

Fig. 17

| CONFIGURATION OF BLADE SHAPE | SUCTION PORT PRESSURE | PRESSURE REDUCTION RATE | COMPRESSION RATIO |
|---|---|---|---|
| FLAT PLATE BLADE | 1 | | 1 |
| SECOND EMBODIMENT | 0.790 | +21.0% | 1.171 |
| THIRD EMBODIMENT | 0.753 | +24.7% | 1.229 |

TURBO-MOLECULAR PUMP BLADE DESIGN

BACKGROUND OF THE INVENTION

1. Technical Field

The present invention relates to a turbo-molecular pump.

2. Background Art

A turbo-molecular pump includes multiple stages of stator blades and a rotary body provided with multiple stages of rotor blades. At each of the stator blades and the rotor blades, multiple radially-formed blades are provided in a circumferential direction. Each blade is inclined with respect to the horizontal direction, and an inclination angle thereof is called a blade angle.

A flat plate blade having a constant blade angle from an inner diameter side to an outer diameter side has been known as the shape of the blade. However, in a turbo-molecular pump described in Patent Literature 1 (JP-A-2000-110771), the blade angle of a blade is, for the purpose of obtaining high-efficiency exhaust performance, maximum at an inner diameter portion and is continuously or intermittently decreased toward an outer diameter side.

SUMMARY OF THE INVENTION

However, a typical design is optimally made to obtain sufficient exhaust performance for argon gas or nitrogen gas, and for this reason, there is a problem that sufficient exhaust performance is not obtained for, e.g., hydrogen gas with a small molecular weight. Under conditions under high temperature, specifically under high-flow-rate/high-back-pressure conditions under high temperature, there is a disadvantage that the exhaust performance for the hydrogen gas and the like is significantly degraded.

A turbo-molecular pump comprises; multiple stages of rotor blades and multiple stages of stator blades alternately arranged in an order of the rotor blade and the stator blade from a pump suction port side. Each of the rotor blades and the stator blades includes, in a circumferential direction, multiple radially-formed blades in a torsion blade shape having different blade angles between an inner diameter side and an outer diameter side. For a ratio $X=S/b$ between an inter-blade distance S as a circumferential interval between adjacent ones of the blades in the circumferential direction and a blade length b as a dimension of an inclined surface of each blade in a width direction, when a value of the ratio X at an outer-diameter-side end portion of each blade is Xout, a value of the ratio X at an inner-diameter-side end portion of each blade is Xin, and a value of the ratio X at an intermediate position between the outer-diameter-side end portion and the inner-diameter-side end portion is Xc, at least one of the multiple stages of the rotor blades and the multiple stages of the stator blades is configured to satisfy any one of a first condition of Xout<Xc and Xin<Xc, a second condition of $\alpha \cdot Xc \geq Xin > Xc > Xout$ where $\alpha=1.04$, or a third condition of $Xin < Xc < Xout \leq \beta \cdot Xc$ where $\beta=1.04$.

The multiple stages of the stator blades are configured to satisfy any one of six conditions including a fourth condition of Xin<Xout<Xc, a fifth condition of Xin≤Xout<Xc, and a sixth condition of Xout≤Xin<Xc in addition to the first condition, the second condition, and the third condition.

A turbo-molecular pump comprises; multiple stages of rotor blades and multiple stages of stator blades alternately arranged in an order of the rotor blade and the stator blade from a pump suction port side. Each of the rotor blades and the stator blades includes, in a circumferential direction, multiple radially-formed blades in a torsion blade shape having different blade angles between an inner diameter side and an outer diameter side. For a ratio $X=S/b$ between an inter-blade distance S as a circumferential interval between adjacent ones of the blades in the circumferential direction and a blade length b as a dimension of an inclined surface of each blade in a width direction, when a value of the ratio X at an outer-diameter-side end portion of each blade is Xout, a value of the ratio X at an inner-diameter-side end portion of each blade is Xin, and a value of the ratio X at an intermediate position between the outer-diameter-side end portion and the inner-diameter-side end portion is Xc, the multiple stages of the rotor blades and the multiple stages of the stator blades include a rotor blade and a stator blade forming a suction stage, a rotor blade and a stator blade forming an intermediate stage, and a rotor blade and a stator blade forming an exhaust stage. The multiple stages of the stator blades are configured to satisfy a first condition of Xin<Xc<Xout at the suction stage, satisfy a second condition of Xin<Xout<Xc at the intermediate stage, and satisfy any one of a third condition of $\alpha \cdot Xc \geq Xin > Xc > Xout$ where $\alpha=1.04$, a fourth condition of Xin≤Xout<Xc, or a fifth condition of Xout≤Xin<Xc at the exhaust stage.

The turbo-molecular pump is used for exhausting hydrogen gas.

An exhausting method for exhausting hydrogen gas comprising a step of exhausting hydrogen gas by using the turbo-molecular pump.

According to the present invention, the exhaust performance for, e.g., the hydrogen gas with the small molecular weight can be improved.

BRIEF DESCRIPTION OF THE DRAWINGS

FIGS. 4A and 4B are tables of one example of a blade angle and a blade number in a comparative example and an embodiment;

FIG. 5 is a table of one example of non-dimensional parameters Xin, Xc, Xout in the embodiment;

FIG. 7 is a table of a performance improvement rate in a case where the blade number is 38 and an outer-diameter-side blade angle θout and an inner-diameter-side blade angle θin are changed;

FIG. 10 is a table of one example of the non-dimensional parameters Xin, Xc, Xout;

FIG. 14 is a table of a performance improvement rate of a single stage of a stator blade for hydrogen gas for an optimal solution of each of a suction stage, an intermediate stage, and an exhaust stage;

FIG. 15 is a table of the performance improvement rate for the hydrogen gas in the case of applying the optimal solution to all stages of the stator blades;

FIG. 16 is a table of a performance improvement rate of a single stage of the rotor blade for argon gas; and FIG. 17 illustrates exhaust performance simulation results in the case of a configuration of a second embodiment and a configuration of a third embodiment.

DETAILED DESCRIPTION OF THE EXEMPLARY EMBODIMENTS

Hereinafter, embodiments of the present invention will be described with reference to the drawings.

First Embodiment

Figure 1:
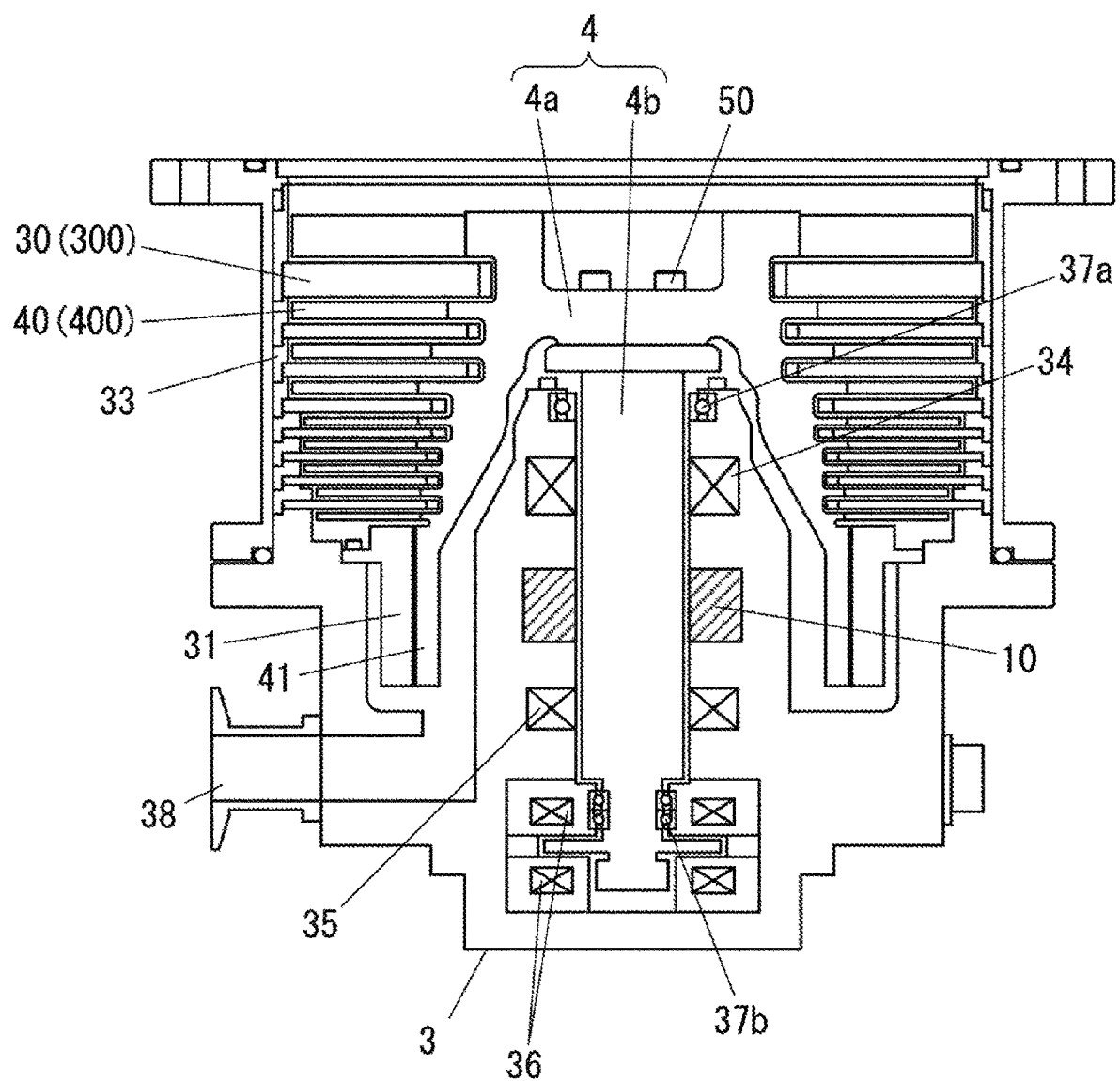
FIG. 1 is a sectional view of one example of a turbo-molecular pump.

FIG. 1 is a sectional view of one example of a turbo-molecular pump 1. Note that in the present embodiment, a magnetic bearing turbo-molecular pump will be described by way of example, but the present invention is not limited to the magnetic bearing type and is applicable to various turbo-molecular pumps. The turbo-molecular pump 1 includes a turbo pump stage having stator blades 30 and rotor blades 40, and a screw groove pump stage having a cylindrical portion 41 and a stator 31.

In the example illustrated in FIG. 1, the turbo pump stage includes eight stages of the stator blades 30 and nine stages of the rotor blades 40. In the screw groove pump stage, a screw groove is formed at the stator 31 or the cylindrical portion 41. The rotor blades 40 and the cylindrical portion 41 are formed at a pump rotor 4a. The pump rotor 4a is fastened to a shaft 4b as a rotor shaft with multiple bolts 50. The pump rotor 4a and the shaft 4b are integrally fastened to each other with the bolts 50, thereby forming a rotary body 4.

The multiple stages of the rotor blades 40 arranged in an axial direction of the pump rotor 4a and the multiple stages of the stator blades 30 are alternately arranged. Each stator blade 30 is stacked in the pump axial direction through a spacer ring 33. The shaft 4b is non-contactly supported by magnetic bearings 34, 35, 36 provided at a base 3. Although not shown in the figure in detail, each of the magnetic bearings 34 to 36 includes an electromagnet and a displacement sensor. A levitation position of the shaft 4b is detected by the displacement sensor.

The rotary body 4 formed by fastening of the pump rotor 4a and the shaft 4b with the bolts is rotatably driven by a motor 10. When the magnetic bearings are not in operation, the shaft 4b is supported by emergency mechanical bearings 37a, 37b. When the rotary body 4 is rotated at high speed by the motor 10, gas on a pump suction port side is sequentially discharged by the turbo pump stage (the rotor blades 40, the stator blades 30) and the screw groove pump stage (the cylindrical portion 41, the stator 31), and then, is discharged through an exhaust port 38. A back pump is connected to the exhaust port 38.

Figure 2:
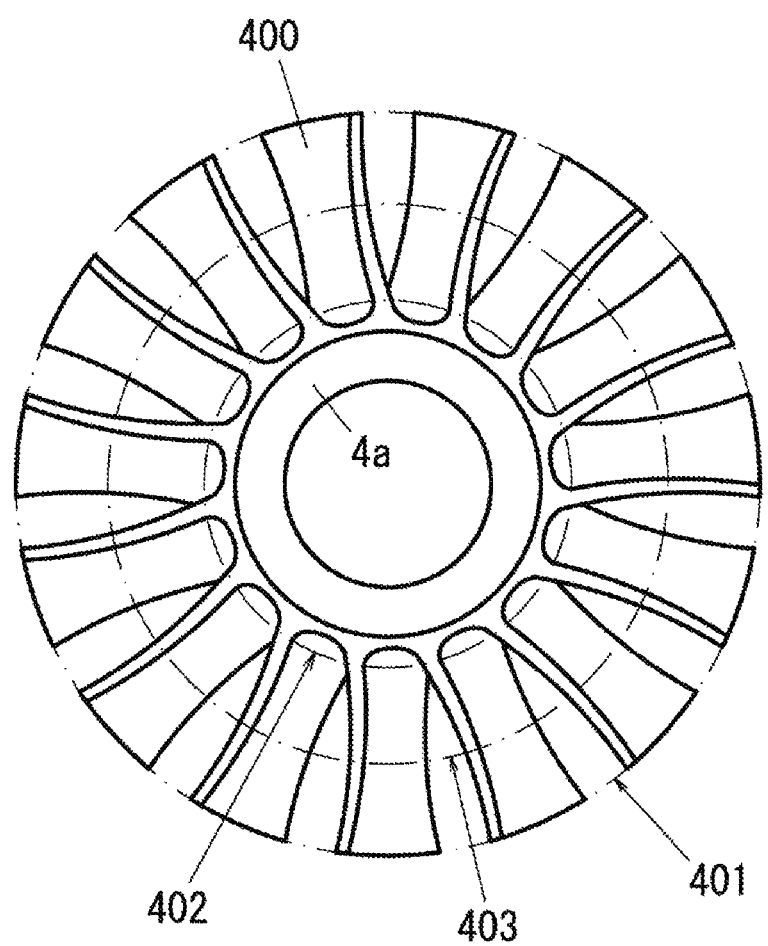
FIG. 2 is a view of a first stage of a rotor blade from a pump suction port side.

FIG. 2 is a schematic view of one example of a blade shape of the rotor blade 40, FIG. 2 being a view of the first stage of the rotor blade 40 from the pump suction port side. Each rotor blade 40 includes multiple blades 400 radially formed from an outer peripheral surface of the bell-shaped pump rotor 4a. Generally, the shape of the blade 400 includes, for example, a flat plate blade having a constant blade angle from an inner diameter side to an outer diameter side of the blade 400, a torsion blade having different blade angles depending on the position of the blade 400 in a radial direction, and a tapered blade of which blade width is narrowed toward a tip end. In the present embodiment, the torsion blade is employed.

A line indicated by a chain line 401 is a circle passing through tip ends of the blades 400, and a line indicated by a chain line 402 is a circle passing through the inner diameter side (the vicinity of bases) of the blades 400. Moreover, a line indicated by a chain line 403 is a circle passing through an intermediate position (an average position) between the tip end and the inner diameter side of each blade 400. Note that although not shown in the figure, each of the multiple stages of the stator blades 30 also includes multiple radially-formed blades 300 as in the case of the rotor blade 40.

Figure 3:
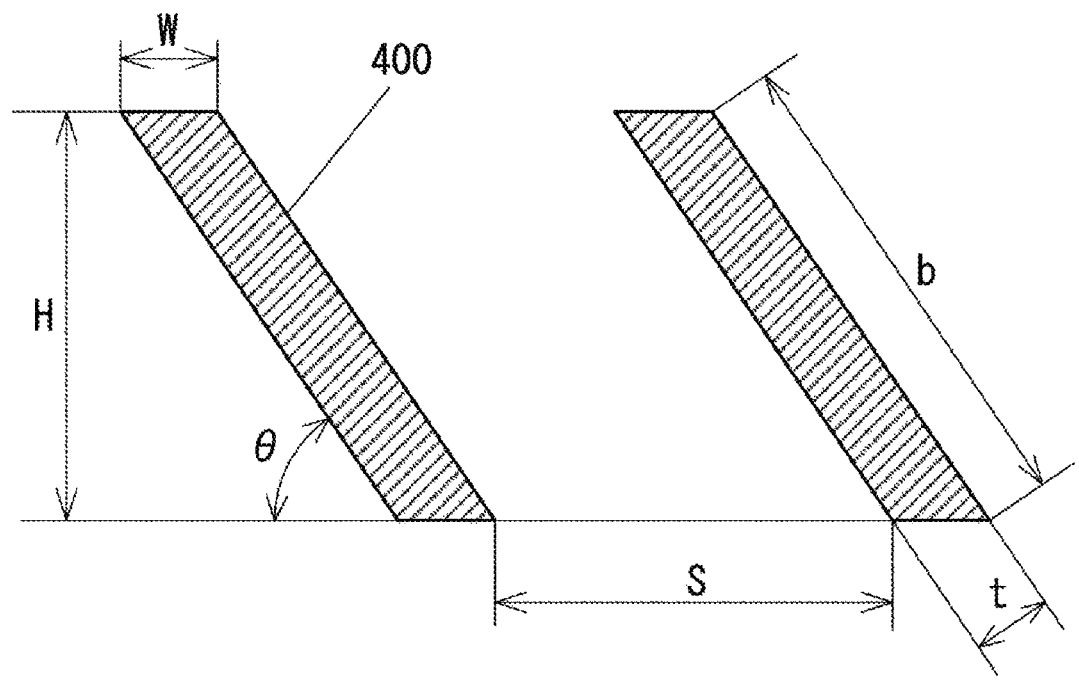
FIG. 3 is a schematic view for describing blade design parameters.

FIG. 3 is a schematic view for describing blade design parameters of the stator blade 30 and the rotor blade 40, FIG. 3 illustrating the circumferential sections (e.g., a sectional view along the chain line 403 of FIG. 2) of two adjacent blades 400 provided at the rotor blade 40.

The blade design parameters include a space S as the interval (the inter-blade distance) of the blade 400 in a circumferential direction, a length (hereinafter referred to as a "blade length") b from a suction-side end portion to an exhaust-side end portion of an inclined surface of the blade 400, a blade height H as the height of the blade 400 in the rotor axial direction, a blade thickness t as the thickness of the blade 400, a blade angle θ as the inclination angle of the blade 400 with respect to a plane perpendicular to the rotor shaft, and a blade upper surface width W as the circumferential width of an end surface of the blade 400 in the rotor axial direction. Regarding these blade design parameters, the parameter most influencing exhaust performance is a non-dimensional parameter X=S/b (also referred to as a "spacing code ratio") as a ratio between the space S and the blade length b.

As described above, the blade shape used for the stator blade 30 and the rotor blade 40 includes, for example, the flat plate blade, the tapered blade, and the torsion blade. In the case of the flat plate blade, the blade length b of the radially-provided blade is constantly set from the inner diameter side to the outer diameter side. Thus, an inner-diameter-side non-dimensional parameter Xin in a section along the chain line 402 of FIG. 2, a non-dimensional parameter Xc at the average position (the intermediate position between the inner diameter side and the outer diameter side) in the section along the chain line 403, and an outer-diameter-side non-dimensional parameter Xout in a section along the chain line 401 satisfy a magnitude relationship as in Condition (1).

$Xin < Xc < Xout$  Condition (1)

Generally, the blade design parameters are, in the turbo-molecular pump, set such that exhaust performance for argon gas or nitrogen gas is optimized (maximized). In this case, in the torsion blade having different blade angles between the inner diameter side and the outer diameter side, it is set such that the non-dimensional parameter X=S/b increases from the inner diameter side to the outer diameter side of the blade as in Condition (1) above.

However, in the turbo-molecular pump set such that the exhaust performance for the argon gas or the nitrogen gas is optimized, there is a problem that sufficient exhaust performance cannot be obtained for gas with a small molecular weight, such as hydrogen gas. Under conditions under high temperature, specifically under high-flow-rate/high-back-pressure conditions under high temperature, there is a problem that the exhaust performance regarding the hydrogen gas and the like is significantly degraded.

In the present embodiment, the non-dimensional parameters X of the stator blade 30 and the rotor blade 40 are set to conditions as described below instead of Condition (1) above, and therefore, the exhaust performance for the gas with the small molecular weight, such as the hydrogen gas, can be more improved. Hereinafter, the hydrogen gas will be described as an example of the gas with the small molecular weight.

Upon optimization of the stator blade 30 and the rotor blade 40 in the present embodiment, the blade design parameters of the stator blade and the rotor blade are first set such that the exhaust performance for the argon gas or the nitrogen gas is optimized. Such set stator and rotor blades will be hereinafter referred to as a "reference blade." Then, the blade design parameters of the reference blade are changed, and in this manner, the blade design parameters are optimized such that the exhaust performance for the hydrogen gas is improved. That is, based on the reference blade, the blade design parameters are optimized such that the hydrogen gas exhaust performance is improved.

Thus, the following configurations influencing the exhaust performance other than the blade design parameters are under the same conditions as those of a turbo-molecular pump with the reference blades. That is, a rotor rotation speed, a rotor outer diameter, the entire height of the turbo pump stage, the number of rotor blade stages, and the number of stator blade stages are under the same conditions as those of the turbo-molecular pump with the reference blades as a comparison target. Moreover, the blade thickness t influencing the strength of the blade is also under the same condition.

Under these preconditions, the non-dimensional parameter $X=S/b$ is changed by a change in the blade angle θ and a blade number n, considering relationships (see FIG. 3) among the parameters such as $H/b=\sin θ$ and $t/W=\sin θ$.

(Derivation of Optimal Conditions)

In the turbo-molecular pump 1 illustrated in FIG. 1, the turbo pump stage includes eight stages of the stator blades 30 and nine stages of the rotor blades 40. The turbo pump stage includes, in this order from the suction port side, a suction stage, an intermediate stage, and an exhaust stage, and the blade design parameters vary according to the stage. Specifically, the first to second stages (the first stage of the rotor blade 40, the first stage of the stator blade 30) from the suction port side are the suction stage, the third to sixth stages (the second to third stages of the rotor blades 40, the second to third stages of the stator blades 30) are the intermediate stage, and the seventh to seventeenth stages (the fourth to ninth stages of the rotor blades 40, and the fourth to eighth stages of the stator blades 30) are the exhaust stage. Note that the rotor outer diameter of the pump rotor with the reference blades in the embodiment is 304 mm, and is equivalent to a pump rotor of a VG300 (JIS standards) turbo-molecular pump.

FIG. 4A illustrates one example of the blade angles (the inner-diameter-side blade angle, the outer-diameter-side blade angle) and blade numbers (the number of blades) of the stator blade 30 and the rotor blade 40 in the case of the reference blade for which the blade design parameters are set such that the argon gas exhaust performance is optimized. The blade shape is the torsion blade, and the inner-diameter-side blade angle is set greater than the outer-diameter-side blade angle. Note that the blade angle θ is set to change at a certain rate along the radial direction. The blade angles and blade numbers of the suction stage, the intermediate stage, and the exhaust stage are set to values corresponding to each stage.

For example, for the second to third stages of the rotor blades 40 and the second to third stages of the stator blades 30 forming the intermediate stage, the blade number is set to 36, the inner-diameter-side blade angle θin is set to 50 deg, and the outer-diameter-side blade angle θout is set to 30 deg. Although not shown in FIG. 4A, the blade angle θ is set to change at the certain rate along the radial direction as described above, and therefore, the blade angle θ at the average position as the intermediate position between the inner diameter side and the outer diameter side is set as in 40 deg (=(50 deg+30 deg)/2).

On the other hand, FIG. 4B illustrates the blade angle and blade number of the torsion blade in the present embodiment. At the suction stage, the blade number is decreased from 16 of the reference blades to 14, and both of the inner-diameter-side and outer-diameter-side blade angles are smaller than those of the reference blade. At the intermediate stage, the blade number is increased from 36 to 38, and the blade angle is set to the same angle as that of the reference blade. At the exhaust stage, the blade number is increased from 34 to 38, and the inner-diameter-side blade angle is greater than that of the reference blade. The outer-diameter-side blade angle is the same as that of the reference blade.

FIG. 5 illustrates the non-dimensional parameters Xin, Xc, Xout in the case of setting the blade angle and the blade number as in FIG. 4B. As illustrated in FIG. 4B, the blade number is, at the suction stage, decreased from 16 to 14, and in this manner, adjustment is made such that the space S is increased. Moreover, the blade angle θ is decreased, and in this manner, adjustment is made such that the blade length b is increased. Accordingly, the values of the non-dimensional parameters Xin, Xc, Xout at the suction stage are changed to values different from those of the suction stage of FIG. 4A.

At the intermediate stage, the blade number is increased from 36 to 38, but the blade angle θ is set to the same angle as that of FIG. 4A. Thus, the space S is decreased due to an increase in the blade number. As a result, the values of the non-dimensional parameters Xin, Xc, Xout are decreased as compared to those in the case of the intermediate stage of FIG. 4A.

At the exhaust stage, the blade number is, as illustrated in FIG. 4B, increased from 34 to 38, and the inner-diameter-side blade angle θin is greater than that of FIG. 4A. In this case, the space S is decreased without changing the blade length b on the outer diameter side. Thus, the non-dimensional parameter Xout (=S/b) is decreased as compared to that of FIG. 4A. On the inner diameter side, the blade angle θin is increased from 20 deg to 23 deg, and therefore, the space S is decreased and the blade length b is decreased.

The blade design parameters (the blade number and the blade angle) of each stage illustrated in FIG. 4B are obtained in such a manner that the blade angle and the blade number are changed with reference to the blade design parameters of the corresponding stage illustrated in FIG. 4A and an optimal solution for improving the exhaust performance as compared to the exhaust performance of the reference blade (the case of FIG. 4A) is searched. Hereinafter, a search result of the blade design parameters of the stator blade 30 at the exhaust stage will be described as one example.

In the case of evaluating the exhaust performance of a single stage of the stator blade 30 in association with a change in the blade design parameters by simulation, the exhaust performance is calculated using three stages including the changed stator blade 30, the rotor blade 40 arranged on the suction side of such a stator blade 30, and the rotor blade 40 arranged on the exhaust side of such a stator blade 30. The blade design parameters illustrated as the reference blade in FIG. 4A are used as the blade design parameters of the rotor blades 40 arranged on the suction and exhaust sides of the stator blade 30. Thus, performance improvement as compared to the reference blade in the case of optimizing the stator blade 30 can be evaluated. Note that regarding specifications, blade temperatures under high-temperature conditions are a stator blade temperature of 80° C. and a rotor blade temperature of 100° C. Thus, in the case of calculating the exhaust performance by simulation, calculation is performed using the temperature=80° C. in the case of the stator blade 30, and is performed using the temperature=100° C. in the case of the rotor blade.

Figure 6A:
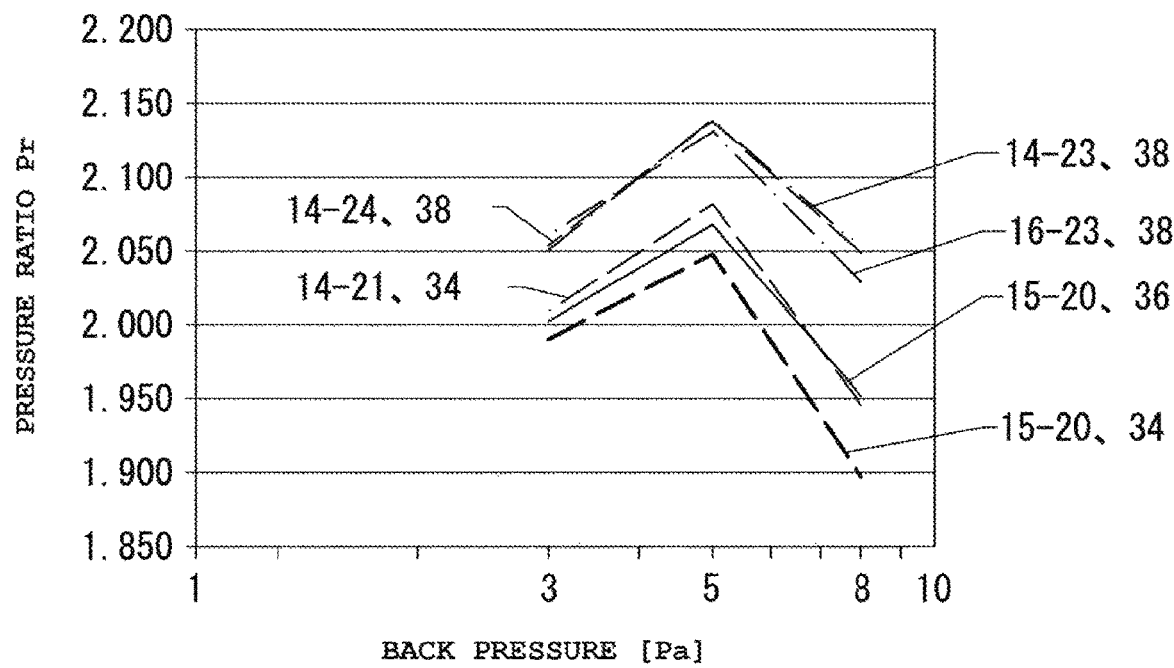
FIGS. 6A and 6B are graphs of some of calculation results of exhaust performance.
Figure 6B:
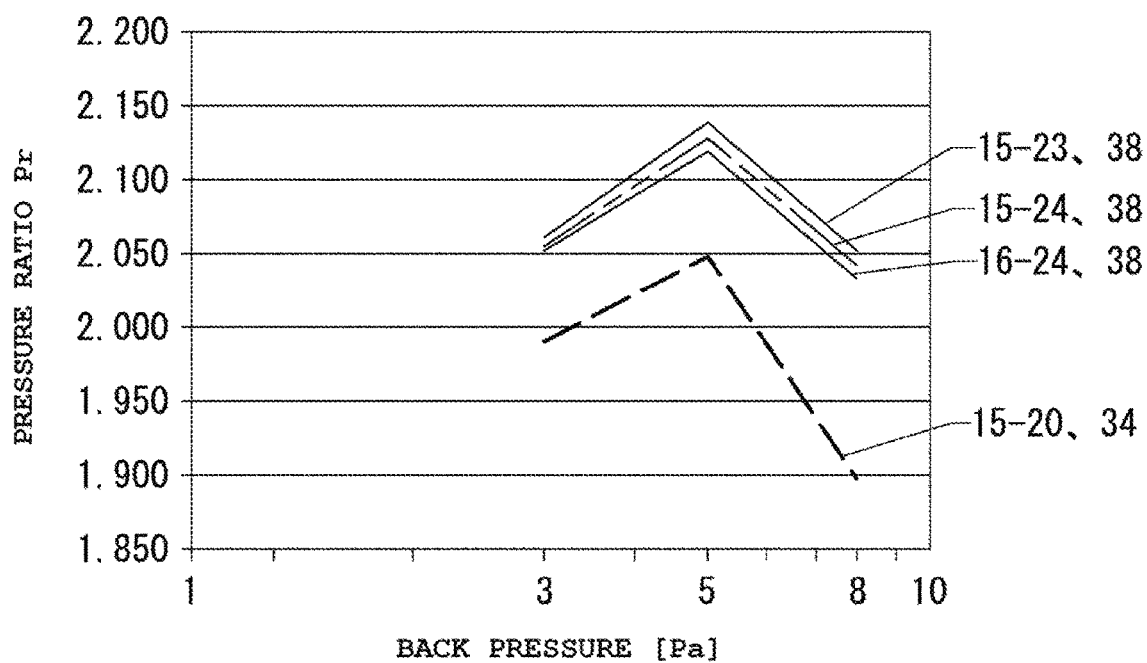

FIGS. 6A and 6B are graphs of some of calculation results of the exhaust performance regarding the stator blade of the exhaust stage, the vertical axis being a pressure ratio Pr and the horizontal axis being a back pressure [Pa]. The exhaust performance was evaluated using the pressure ratio Pr as a ratio (an exhaust-side pressure Pout/a suction-side pressure Pin) between the exhaust-side pressure and the suction-side pressure. Note that the flow rate of the hydrogen gas to be discharged was constant at 300 sccm (standard cc/min, 1 atm) and the exhaust performance was obtained at three points (3 Pa, 5 Pa, 8 Pa) of the back pressure (the exhaust-side pressure of three stages) within an assumed operating pressure range of 2 to 8 Pa.

FIGS. 6A and 6B show the blade design parameters θout, θin of each line and the blade number as in (15-20, 34). (15-20, 34) indicates that the outer-diameter-side blade angle θout is 15 deg, the inner-diameter-side blade angle θin is 20 deg, and the blade number is 34. A line (15-20, 34) indicates the pressure ratio Pr in the case of the blade design parameters (the blade angle and the blade number) of the exhaust stage as illustrated in FIG. 4A, and such a line is a reference upon searching of the optimal solution.

FIG. 6A illustrates the line (15-20, 34) of the reference blade and a line (14-21, 34), a line (14-24, 38), a line (15-20, 36), a line (16-23, 38), and a line (14-23, 38) with changed blade design parameters. FIG. 6B illustrates the line (15-20, 34) of the reference blade and a line (16-24, 38), a line (15-24, 38), and a line (15-23, 38) with changed blade design parameters.

FIG. 7 illustrates a performance improvement rate in a case where the blade number is 38 and the outer-diameter-side blade angle θout and the inner-diameter-side blade angle θin are changed to various values. The performance improvement rate indicates the percentage of improvement of the pressure ratio Pr as compared to the line (15-20, 34) of the reference blade. When the case of the blade angle θout and the blade angle θin is expressed as in a blade angle (θout−θin) in FIG. 7, the section of a blade angle (12-23) is, for example, described as "1.3-7.7." This indicates that as compared to the line (15-20, 34) of the reference blade, the minimum performance improvement rate is 1.3% and the maximum performance improvement rate is 7.7%.

FIG. 7 also illustrates the performance improvement rate regarding other combinations than the blade angle (θout−θin) illustrated in FIGS. 6A and 6B in the case of a blade number of 38. As described later, a blade angle (15-23) is the optimal solution with the highest pressure ratio improvement rate (i.e., the highest performance improvement rate) as compared to the reference blade. Hereinafter, blade angles (θout−θin) with reference characters A to E will be referred to as optimal solution candidates in the vicinity of the optimal solution, and blade angles (θout−θin) with reference characters F to K will be referred to as sub-candidates present at the periphery of the optimal solution candidates A to E.

Note that in the case of forming the stator blade by die casting, the inner-diameter-side blade angle θin of the stator blade cannot be set as necessary, and depends on the inner diameter dimension of the stator blade. The inner diameter dimension of the stator blade also depends on a rotor diameter, and therefore, a smaller rotor diameter and a smaller inner diameter dimension of the stator blade result in a greater processable inner-diameter-side blade angle θin. In the case of the stator blade of the present embodiment having the same blade inner diameter and the same blade outer diameter as those of the reference blade, when the blade number is 38, it is difficult to process, by die casting, a blade shape with an inner-diameter-side blade angle θin of θin <22 deg. However, even in the case of the blade shape difficult to be processed, simulation calculation can be performed, and therefore, FIG. 7 also illustrates the performance improvement rate of the blade shape with θin <22 deg as a reference.

Referring to FIGS. 6A, 6B, and 7, the pressure ratios Pr in the case of changing only the blade number n without changing the blade angle θ are first compared. When the pressure ratios Pr in the case of the same blade angles θout, θin as those of the reference blade (15-20, 34) are compared, it is shown that the pressure ratio Pr is greater in a case where the blade number is increased to 36 or 38 greater than a reference blade number of 34, i.e., in a case where the space S of X=S/b is decreased. Then, when the performance improvement rates in the case where the blade numbers are 36 and 38 in FIGS. 6A and 6B are compared, the case of 38 shows more noticeable improvement.

Moreover, as seen from the performance improvement rate of FIG. 7, the minimum value of the performance improvement rate is greater than three and the maximum value of the performance improvement rate is a great value of 8.5 to 9.0% in the vicinity of a blade angle (θout−θin) of (14-21), (14-22), and (15-22). Moreover, FIGS. 6A and 6B also show that in the case of a blade number of 34, the performance improvement rate is higher in the case of the blade angle (14-21) than in the case of the blade angle (15-20), and the performance improvement rate is about (1% to 3%). As described above, it is assumed that even in the case of changing the blade number, the peak of the exhaust performance is shown in the vicinity of a similar blade angle (θout−θin). Note that the exhaust performance in the vicinity of the peak is higher in the case of a blade number of 38 than in the case of a blade number of 34. Note that in the case of the stator blade of the present embodiment, when the blade number is further increased to 40, it is difficult to process the blade due to a relationship with the stator blade inner diameter, and for this reason, the upper limit of the blade number is 38 in this case.

As described above, it is shown that the optimal solution is obtained in the case of a blade number of 38 as illustrated in FIG. 7. Note that in the case of forming the stator blade by die casting, i.e., the case of the stator blade in the present embodiment as described above, it is difficult to perform processing at a blade angle θin of equal to or smaller than 22 deg in the case of a blade number of 38 due to the relationship with the stator blade inner diameter dimension. For this reason, the optimal solution was searched for a processable blade angle θin of θin >23 deg in this case. As a result, the case of θout=15 deg, θin=23 deg, and a blade number of 38 was obtained as the optimal solution. Note that the performance improvement rate is slightly lower than the optimal solution, but a sufficient performance improvement rate is also obtained for the blade design parameters (the blade angle and the blade number) in the vicinity of the optimal solution.

Note that in the example illustrated in FIG. 7, the optimal solution is θout=15 deg and θin=23 deg within a processable range of θin≥23 deg. For example, in a case where the processable range is θin≥22 deg, θin=22 deg is the optimal solution in the case of θout=15 deg, or θin=22 deg is the optimal solution in the case of θout=14 deg. In these cases, a search method as described below can be also applied.

Figures 8A, 8B:
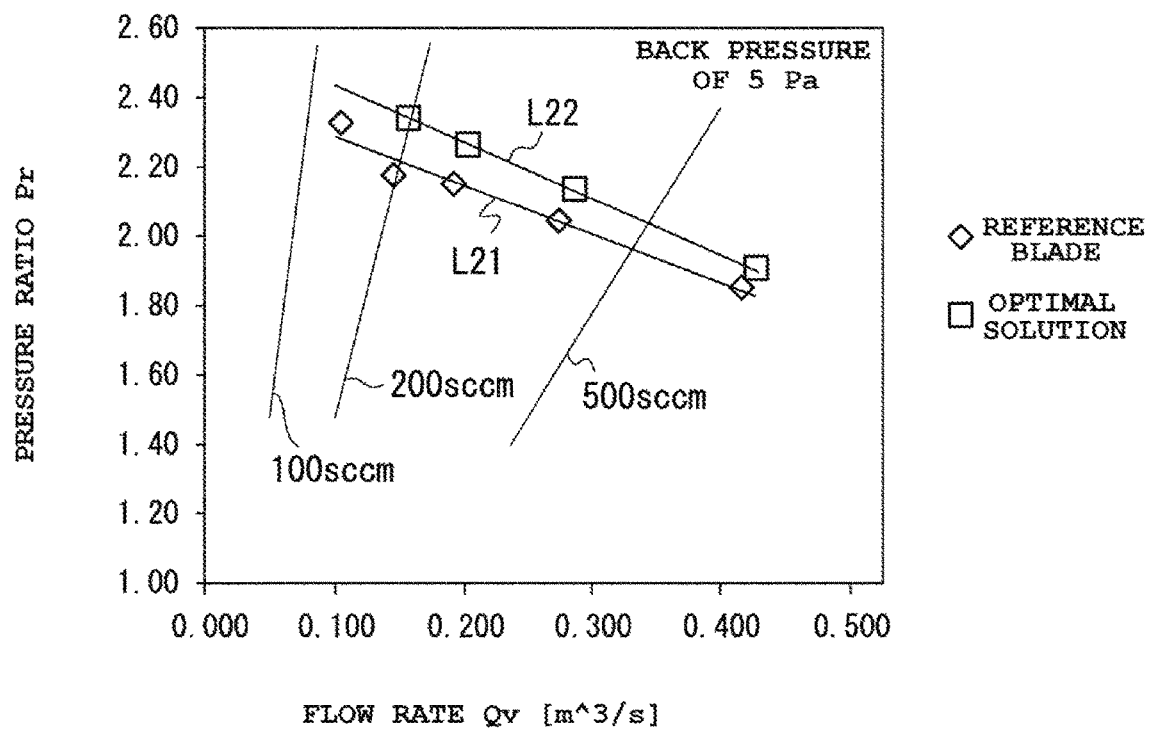
FIGS. 8A and 8B are a graph and a table of a relationship between a volume flow rate Qv and a pressure ratio Pr for a reference blade and an optimal solution at a back pressure of 5 Pa.
Figures 9A, 9B:
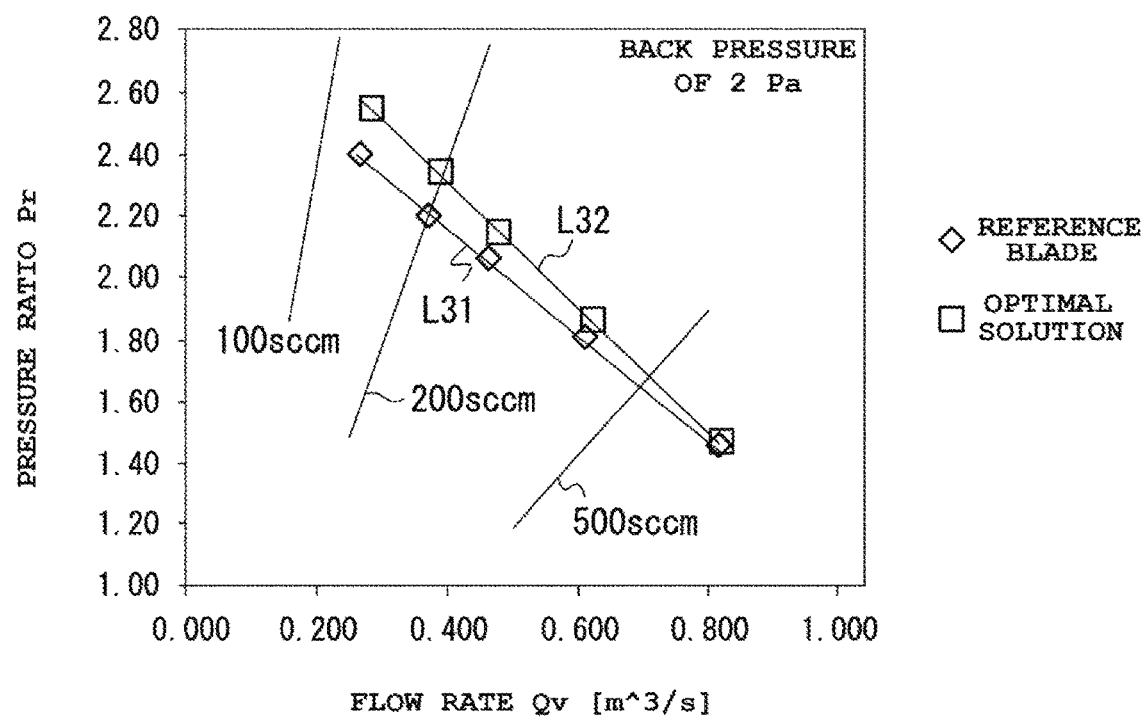
FIGS. 9A and 9B are a graph and a table of the relationship between the volume flow rate Qv and the pressure ratio Pr for the reference blade and the optimal solution at a back pressure of 2 Pa.

FIGS. 8A, 8B, 9A, and 9B illustrate a relationship between a volume flow rate Qv and the pressure ratio Pr in the case of the reference blade (15-20, 34) and the optimal solution (15-23, 38). FIG. 8A illustrates a change in the pressure ratio Pr when the back pressure is fixed at 5 Pa and the flow rate is changed between 100 sccm to 500 sccm, and FIG. 8B illustrates Pr(max) and Qv(max) in this case. Moreover, FIG. 9A illustrates a change in the pressure ratio Pr when the back pressure is fixed at 2 Pa and the flow rate is changed between 100 sccm to 500 sccm, and FIG. 9B illustrates Pr(max) and Qv(max) in this case.

Note that the volume flow rate Qv of the horizontal axis in FIGS. 8A and 9A indicates the flow rate of gas of which pressure is the same as the suction-side pressure. When the pressure ratio Pr varies, the suction-side pressure in such a case also varies. Thus, even when the same value of the volume flow rate Qv is applied, if the pressure ratio Pr varies, the flow rate measured in units of a flow rate sccm varies. FIGS. 8A and 9A also illustrate each of a line indicating a flow rate of 100 sccm, a line indicating a flow rate of 200 sccm, and a line indicating a flow rate of 500 sccm.

In this case, 1 sccm=$1.69 \times 10^{-3}$(Pa·m³/s), and therefore, y sccm is converted into y×γ(Pa·m³/s) when γ=$1.69 \times 10^{-3}$. When the suction-side pressure is expressed as Pin(Pa), the flow rate is Qv×Pin(Pa·m³/s). When such a flow rate is equal to y sccm, an equality of Qv×Pin=y×γ is satisfied. Since Pr=Pout/Pin, the volume flow rate Qv is Qv=y·γ·(Pr/Pout). Thus, a line indicating y sccm is represented by a line of Pr=(Pout/yγ)Qv in FIGS. 8A and 9A.

In the case of a back pressure of 5 Pa (=Pout), the line of 100 sccm is represented by an expression of Pr=(Pout/yγ)Qv=(5/0.169)Qv=29.6 Qv. Similarly, the line of 200 sccm is represented by Pr=14.8 Qv, and the line of 500 sccm is represented by Pr=5.92 Qv. Moreover, in the case of a back pressure of 2 Pa, the line indicating 100 sccm is represented by Pr=(Pout/yγ)Qv=(2/0.169)Qv=11.8 Qv, the line indicating 200 sccm is represented by Pr=5.92 Qv, and the line indicating 500 sccm is represented by Pr=2.37 Qv.

In FIGS. 8A and 9A, lines L21, L31 are Qv-Pr lines estimated from calculation data on the reference blade, and lines L22, L32 are Qv-Pr lines estimated from calculation data on the optimal solution. The pressure ratio Pr at an intersection between each of the lines L21 to L32 and the vertical axis is a pressure ratio in a case where the volume flow rate Qv is zero, and indicates the maximum value Pr(max) of the pressure ratio. On the other hand, the volume flow rate Qv at an intersection between each of the lines L21 to L32 and the horizontal axis is a flow rate in a case where the pressure ratio is one, and indicates the maximum value Qv(max) of the volume flow rate Qv.

In the case of a back pressure of 5 Pa as illustrated in FIGS. 8A and 8B, Pr(max)=2.44 and Qv(max)=1.01 are satisfied in the case of the reference blade indicated by the line L21, and Pr(max)=2.60 and Qv(max)=0.99 are satisfied in the case of the optimal solution indicated by the line L22. Moreover, in the case of a back pressure of 2 Pa as illustrated in FIGS. 9A and 9B, Pr(max)=2.85 and Qv(max)=1.09 are satisfied in the case of the reference blade indicated by the line L31, and Pr(max)=3.12 and Qv(max)=1.06 are satisfied in the case of the optimal solution indicated by the line L32.

In the case of a back pressure of 5 Pa, Pr(max) is higher by about 10% in the case of the optimal solution than in the case of the reference blade, and Qv(max) indicates a slightly-greater value in the case of the reference blade than in the case of the optimal solution. It is shown that at a flow rate of 100 sccm to 200 sccm at an actual operating point, the performance is higher by about 6% in the case of the optimal solution than in the case of the reference blade. Moreover, in the case of a back pressure of 2 Pa, the performance is higher by about 7% in the case of the optimal solution than in the case of the reference blade at an operating point flow rate of 100 sccm to 200 sccm. Moreover, in the case of comparison in a flow rate range of 100 sccm to 500 sccm, the performance in the case of the blade shape of the optimal solution exceeds the performance in the case of the reference blade at any back pressure of 5 Pa and 2 Pa.

FIG. 10 illustrates, as the blade design parameters, the non-dimensional parameters Xin, Xc, Xout in the case of the reference blade (15-20, 34) and the optimal solution (15-23, 38), the optimal solution candidates A to E, and the sub-candidates F to K illustrated in FIG. 7.

Figure 11:
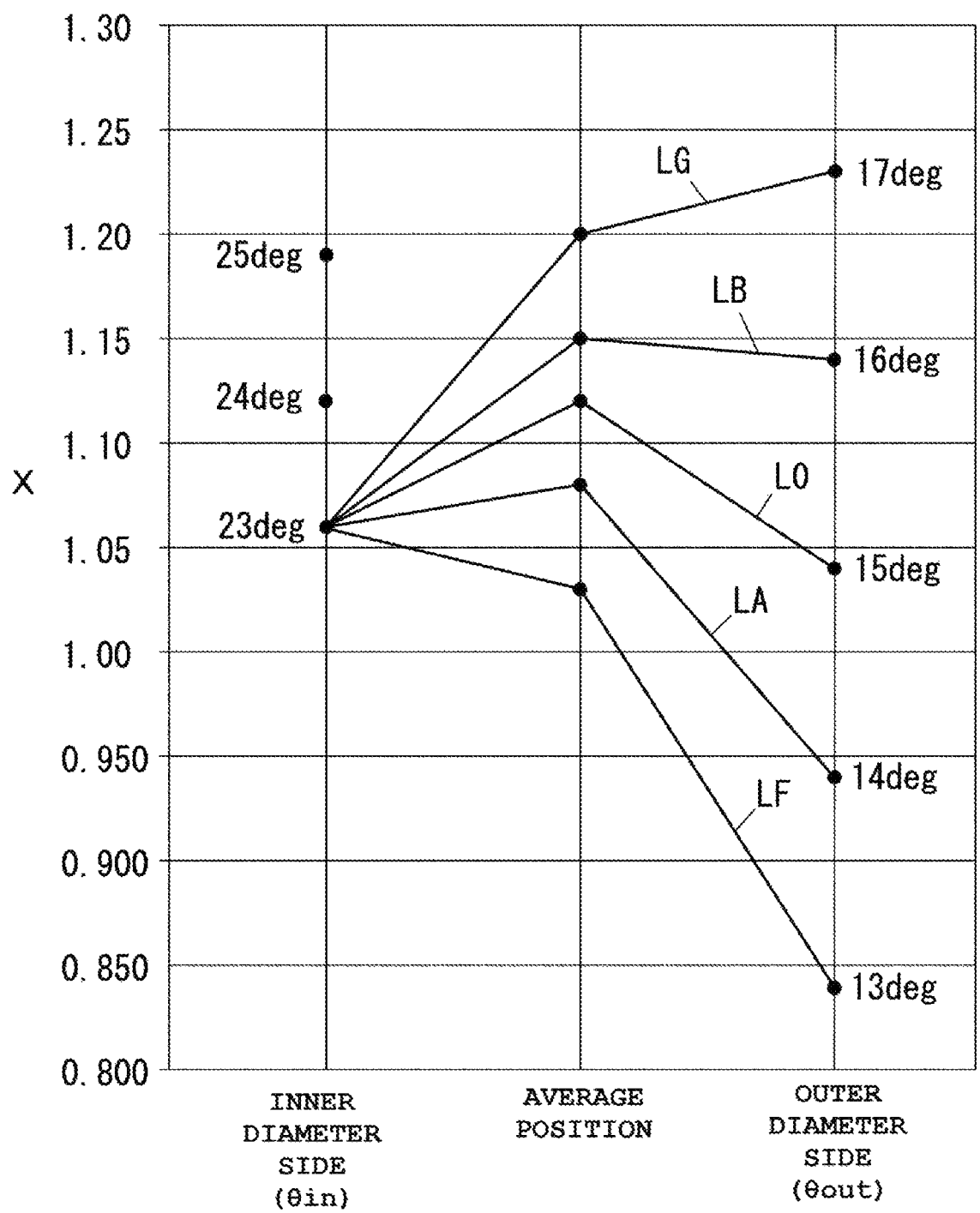
FIG. 11 is a graph of a change in the non-dimensional parameter X regarding the optimal solution, optimal solution candidates A, B, and sub-candidates F, G.
Figure 12:
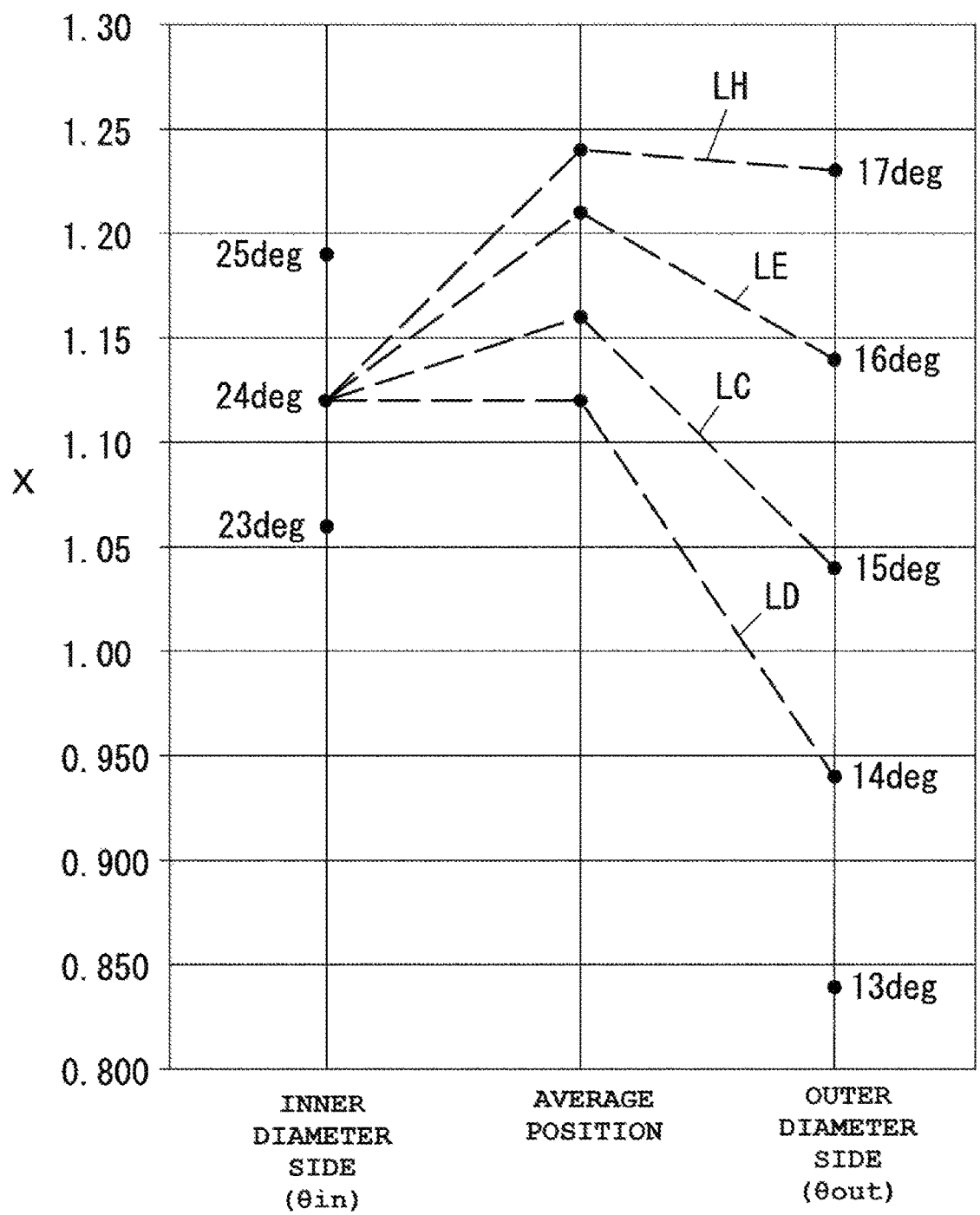
FIG. 12 is a graph of a change in the non-dimensional parameter X regarding optimal solution candidates C, D, E and a sub-candidate H.
Figure 13:
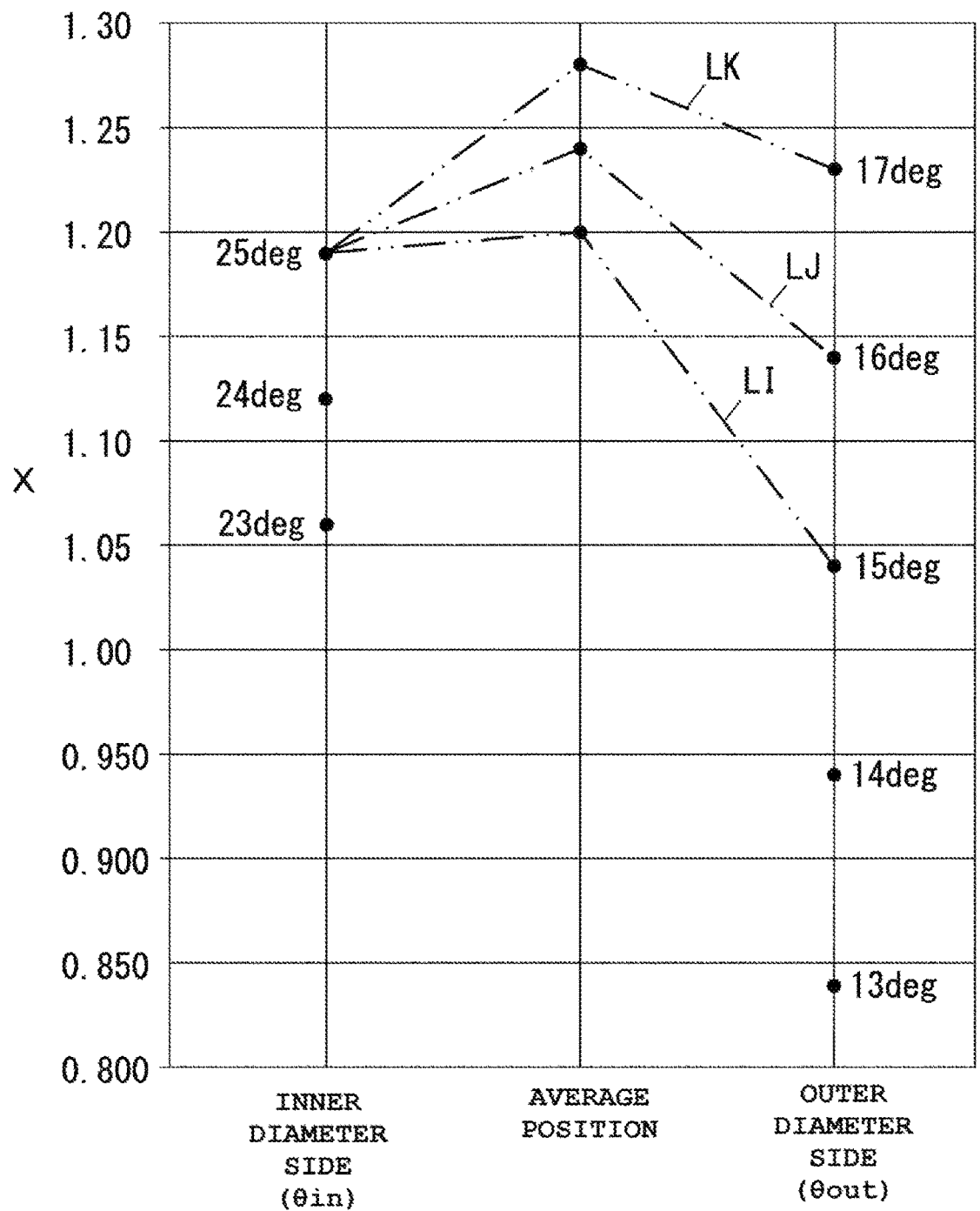
FIG. 13 is a graph of a change in the non-dimensional parameter X regarding sub-candidates I, J, K.

Moreover, FIGS. 11 to 13 are tables of the state of change in the non-dimensional parameter X along a blade radial direction, the vertical axis indicating the non-dimensional parameter X (Xin, Xc, Xout) and the horizontal axis indicating a position in the blade radial direction. FIG. 11 illustrates a change in the non-dimensional parameter X regarding the optimal solution (a line L0), the optimal solution candidates A, B (lines LA, LB), and the sub-candidates F, G (lines LF, LG) indicating an inner-diameter-side blade angle θin of 23 deg. FIG. 12 illustrates a change in the non-dimensional parameter X regarding the optimal solution candidates C, D, E (lines LC, LD, LE) and the sub-candidate H (a line LH) indicating an inner-diameter-side blade angle θin of 24 deg. FIG. 13 illustrates a change in the non-dimensional parameter X regarding the sub-candidates I, J, K (lines LI, LJ, LK) indicating an inner-diameter-side blade angle θin of 25 deg.

The line L0 indicating the optimal solution (15-23, 38) in FIG. 11 shows a magnitude relationship among the non-dimensional parameters Xin, Xc, Xout as "Xin<Xc and Xout<Xc." That is, the shape of the line L0 is such a mountain line shape that the average position is high and the inner and outer diameter sides on both sides of the average position are lower than the average position.

On the other hand, for the optimal solution candidate A indicating an inner-diameter-side blade angle θin of 23 deg as in the optimal solution, the outer-diameter-side blade angle θout at the optimal solution (15-23, 38) is changed from 15 deg to 14 deg. When the blade angle decreases, the blade length b increases. Thus, in this case, the blade lengths b on the outer diameter side and at the average position increase, and the non-dimensional parameters Xout, Xc decrease. As a result, as compared to the line LO, the gradient of the line LA from the average position to the outer diameter side is greater, and the gradient of the line LA from the average position to the inner diameter side is smaller. Moreover, when the blade angle θout is further decreased as in the line LF of θout=13 deg, the magnitude relationship among the non-dimensional parameters X is as in Xin>Xc>Xout.

Conversely, when the outer-diameter-side blade angle θout is increased from 15 deg to 16 deg as in the line LB, the gradient of the line from the average position to the outer diameter side is smaller, and the gradient of the line from the average position to the inner diameter side is greater. Further, when the blade angle θout is increased to θout=17 deg as in the line LG, the magnitude relationship among the non-dimensional parameters X is Xin<Xc<Xout, contrary to the case of θout=13 deg (the case of the line LF).

FIG. 12 is a case where the inner-diameter-side blade angle θin is increased from 23 deg to 24 deg. In this case, as the inner-diameter-side blade angle θin increases, the blade lengths b on the inner diameter side and at the average position decrease, and the non-dimensional parameters Xin, Xc increase. That is, in the case of comparison with the line LA of FIG. 11 having the same θout=14 deg, the non-dimensional parameters Xin, Xc of the line LD with a greater blade angle θin are greater than the non-dimensional parameters Xin, Xc of the line LA. In the case of the lines LC, LE, LH, the non-dimensional parameters Xin, Xc are greater as compared to LO, LB, LG of FIG. 11 with the same outer-diameter-side blade angle θout. Thus, the line LG of FIG. 11 shows Xin<Xc<Xout, but the line LH of FIG. 12 shows a changed magnitude relationship as in Xin<Xc and Xc>Xout.

Further, when the inner-diameter-side blade angle θin is increased to 25 deg as in the lines LI, LJ, LK of FIG. 13, the non-dimensional parameters Xin, Xc on the inner diameter side and at the average position are greater as compared to the corresponding lines LC, LE, LH of FIG. 10.

As described above, it can be interpreted as follows from a relationship among the blade angles θin, θout of the lines LO, LA to LK illustrated in FIGS. 11 to 13 and the non-dimensional parameters Xin, Xc, Xout. That is, when the blade angle θout is decreased to 14 deg and 13 deg from the optimal solution (15-23, 38) of the table illustrated in FIG. 7 to the upper side of the table, the magnitude relationship among the non-dimensional parameters Xin, Xc, Xout is, as illustrated in FIG. 11, "Xin<Xc and Xout<Xc" in the case of θout=14 deg as in θout=15 deg, but changes to "Xin>Xc>Xout" in the case of θout=13 deg. Conversely, when the blade angle θout is increased to 16 deg and 17 deg from the optimal solution (15-23) to the lower side of the table of FIG. 7, the magnitude relationship among the non-dimensional parameters Xin, Xc, Xout is "Xin<Xc and Xout<Xc" in the case of θout=16 deg as in the case of θout=15 deg, but changes to "Xin<Xc<Xout" in the case of θout=17 deg.

The lines LO, LB of FIG. 11 and the lines LC, LE of FIG. 12 in a case where the inner-diameter-side blade angle θin is increased from 23 deg to 24 deg are compared. In any of the case of the lines LO, LB and the case of the lines LC, LE, "Xin<Xc and Xout<Xc." However, a difference between Xc and Xin is smaller and a difference between Xc and Xout is greater in the case of the lines LC, LE with a greater blade angle θin. When the line LG and the line LH with θout=17 deg are compared, θin is increased from 23 deg to 24 deg, and therefore, the magnitude relationship among Xin, Xc, Xout changes from "Xin<Xc<Xout" to "Xin<Xc and Xout<Xc." When the line LA and the line LD with θout=14 deg are compared, θin increases, and therefore, the magnitude relationship among Xin, Xc, Xout changes from "Xin<Xc and Xout<Xc" to "Xin=Xc>Xout."

It is shown that as illustrated in FIG. 7, the performance improvement rate decreases from the optimal solution toward the periphery (an upper-to-lower direction or a right-to-left direction of the table) thereof. For example, when the performance improvement rates of the optimal solution candidates A to G are compared under a condition of θin=23 deg, the optimal solution candidates A to E show a performance improvement rate minimum value of about 3, but the optimal solution candidates F, G adjacent to these candidates on an outer peripheral side show a performance improvement rate minimum value of about 2. At θout=12 deg and 18 deg, the minimum value decreases to about one.

Considering a processing error upon blade processing of the stator blade or the rotor blade, a minimum value of about 2 is necessary to avoid a performance improvement rate minimum value of equal to or smaller than one due to the processing error. The blade angles θin, θout and the non-dimensional parameters Xin, Xc, Xout are in a relationship as illustrated in FIGS. 11 to 13, and therefore, the upper limit of Xin in the case of "Xin>Xc>Xout" is, as in the line LF of FIG. 11, Xin in the case of the blade angle (13-23) illustrated in FIG. 7. In a case where Xin at this point is represented by Xin=α·Xc, the magnitude relationship among the non-dimensional parameters Xin, Xc, Xout is represented by "α·Xc>Xc>Xout."

Moreover, the upper limit of Xout in the case of "Xin<Xc<Xout" is, as in the line LG of FIG. 11, Xout in the case of the blade angle (17-23) illustrated in FIG. 7. In a case where Xout at this point is represented by Xout=β·Xc, the magnitude relationship among the non-dimensional parameters Xin, Xc, Xout is represented by "Xin<Xc<β·Xc." Note that in the example of the exhaust stage illustrated in FIG. 7, α and β are about 1.03 to 1.04.

To summarize the description above, the optimal solution candidates (including the above-described optimal solution and the above-described optimal solution candidates A to E) with a performance improvement rate minimum value of equal to or greater than two satisfy Conditions (2), (3), and (4) below. That is, the non-dimensional parameters Xin, Xc, Xout are set to satisfy Conditions (2), (3), and (4), and therefore, a turbo-molecular pump having excellent hydrogen gas exhaust performance can be obtained. Note that the optimal solution is set considering whether or not blade processing is available. For example, in the example illustrated in FIG. 7, the blade angles (14-21), (14-22) show a higher performance improvement rate than that of the blade angle (14-23) selected as the optimal solution, but are excluded in the case of the stator blade of the present embodiment due to a difficulty in blade processing.

| | |
|---|---|
| "Xin<Xc and Xout<Xc" | Condition (2) |
| "Xin<Xc<Xout≤β·Xc, note that β=1.04" | Condition (3) |
| "α·Xc≥Xin>Xc>Xout, note that α=1.04" | Condition (4) |

In the description of FIGS. 6A and 6B to 13 above, optimization of the stator blade of the exhaust stage has been described. Further, for the stator blades of the suction stage and the intermediate stage, the optimal solutions can be also searched by processing similar to that of the case of the exhaust stage. Moreover, for the stator blades of the suction stage and the intermediate stage, the non-dimensional parameters Xin, Xc, Xout are also set to satisfy the conditions represented by Conditions (2) to (4), and therefore, a turbo-molecular pump having excellent exhaust performance regarding the gas with the small molecular weight, such as the hydrogen gas, can be obtained. Note that any of Conditions (2) to (4) to be applied for each stator blade of the suction stage, the intermediate stage, and the exhaust stage is, as necessary, preferably selected considering, e.g., the blade height of each stage and a pressure condition.

FIG. 14 illustrates, for the hydrogen gas, the performance improvement rate of the single stage of the stator blade for each optimal solution of the suction stage, the intermediate stage, and the exhaust stage. Note that the temperature of the stator blade is 80° C., assuming the high-temperature conditions. As seen from FIG. 14, the performance improvement rate is higher in the case of 200 sccm as a higher flow rate of the hydrogen gas.

FIG. 14 illustrates the performance improvement rate of the single stage of the stator blade, but the optimal solution of each stage is applied to all stages of each of the suction stage, the intermediate stage, and the exhaust stage so that the performance can be further improved. FIG. 15 illustrates, for the hydrogen gas, the performance improvement rate in the case of applying the optimal solution to all stages of the stator blades. A higher flow rate results in a higher performance improvement rate. Note that calculation was performed at a stator blade temperature of 80° C.

In the description above, performance improvement in a case where the rotor blades of the reference blades are arranged on the upper and lower sides of the stator blade of the optimal solution has been described. However, in a case where the rotor blade is in the blade shape of the optimal solution and the stator blade is in the blade shape of the reference blade, the non-dimensional parameters Xin, Xc, Xout are set to satisfy Conditions (2) to (4), and therefore, the hydrogen gas exhaust performance can be improved.

In the case of applying the optimal solution to the rotor blade, performance improvement has been shown for not only the hydrogen gas but also the argon gas. FIG. 16 illustrates the performance improvement rate of a single stage of the rotor blade (simulation is performed for a three-stage configuration in which the stator blades of the reference blades are arranged on the upper and lower sides of the rotor blade of the optimal solution) for the argon gas. Note that in the case of the rotor blade, calculation was performed at a temperature of 100° C.

In the first embodiment described above, at least one of the multiple stages of the rotor blades and the multiple stages of the stator blades is configured to satisfy any one of Conditions (2), (3), and (4) above, and therefore, the exhaust performance under the high-flow-rate and high-back-pressure conditions upon discharging of the hydrogen gas can be improved as compared to a turbo-molecular pump including flat plate blades or torsion blades of Condition (1) as in a typical case.

Second Embodiment

The above-described first embodiment has described that Conditions (2) to (4) above have been found as the conditions for the non-dimensional parameter X=S/b for improving hydrogen gas exhaust characteristics. In a second embodiment, at least one of multiple stages of rotor blades 40 and multiple stages of stator blades 30 is configured to satisfy any one of six conditions including Conditions (5) to (7) below in addition to Conditions (2) to (4).

$Xin<Xout<Xc$      Condition (5)

$Xin<Xout<Xc$      Condition (6)

$Xout<Xin<Xc$      Condition (7)

With this configuration, exhaust performance under high-flow-rate and high-back-pressure conditions upon discharging of hydrogen gas can be further improved. The number of stages of the stator blades 30 and the number of stages of the rotor blades 40 are decreased as compared to the case of the first embodiment, and therefore, a turbo-molecular pump can be more downsized.

Third Embodiment

In a third embodiment, multiple stages of rotor blades 40 and multiple stages of stator blades 30 include rotor blades 40 and stator blades 30 forming a suction stage, rotor blades 40 and stator blades 30 forming an intermediate stage, and rotor blades 40 and stator blades 30 forming an exhaust stage, and at least one of the multiple stages of the rotor blades 40 and the multiple stages of the stator blades 30 is configured to satisfy Condition (1) as a typical condition at the suction stage, satisfy Condition (5) at the intermediate stage, and satisfy any one of Conditions (4), (6), and (7) at the exhaust stage.

$Xin<Xc<Xout$      Condition (1)

$Xin<Xout<Xc$      Condition (5)

"$\alpha \cdot Xc \geq Xin > Xc > Xout$, note that $\alpha=1.04$"      Condition (4)

$Xin \leq Xout < Xc$      Condition (6)

$Xout \leq Xin < Xc$      Condition (7)

Hydrogen gas exhaust performance under high-flow-rate and high-back-pressure conditions can be further improved as compared to the above-described second embodiment by division into three stages including the suction stage, the intermediate stage, and the exhaust stage and setting to the optimal condition according to each stage as described above. FIG. 17 illustrates exhaust performance simulation results in the case of the configuration of the second embodiment and the configuration of the third embodiment, and illustrates a suction port pressure and a compression ratio under a condition of a hydrogen gas flow rate=1500 sccm as a ratio taking exhaust performance of a typical flat plate blade as one. In simulation, the exhaust performance was calculated for a configuration with the total of 29 stages including 14 stages of the stator blades and 15 stages of the rotor blades, but the performance is also similarly improved for other stage numbers.

Regarding a suction high pressure, a pressure reduction of 21.0% is shown in the second embodiment, and a pressure reduction of 24.7% is shown in the third embodiment, as illustrated in FIG. 17. Moreover, regarding a compression ratio, improvement to 1.171 times is shown in the second embodiment, and improvement to 1.229 times is shown in the third embodiment.

As in the case of the above-described first embodiment, in the cases of the second embodiment and the third embodiment, the hydrogen gas exhaust performance can be also improved in a case where the above-described conditions regarding the non-dimensional parameters Xin, Xc, Xout are applied to the rotor blade 40 instead of the stator blade 30. Further, the performance for the hydrogen gas can be also improved in a case where the above-described conditions are applied to all stages of the stator blades and the rotor blades.

Note that the present invention is not limited to the above-described contents, and other aspects conceivable within the scope of the technical idea of the present invention are also included in the scope of the present invention. For example, the magnetic bearing turbo-molecular pump having the screw groove pump stage has been described in the above-described embodiments by way of example, but the present invention is not limited to the magnetic bearing type and is also applicable to a turbo-molecular pump having only a turbo pump stage without a screw groove pump stage.

What is claimed is:

1. A turbo-molecular pump comprising;
multiple stages of rotor blades and multiple stages of stator blades are alternately arranged, wherein
each of the rotor blades and the stator blades includes, in a circumferential direction, multiple radially-formed blades in a torsion blade shape having different blade angles between an inner diameter side and an outer diameter side, and
for a ratio $X=S/b$ between an inter-blade distance S as a circumferential interval between adjacent ones of the blades in the circumferential direction and a blade length b as a dimension of an inclined surface of each blade in a width direction, when a value of the ratio X at an outer-diameter-side end portion of each blade is Xout, a value of the ratio X at an inner-diameter-side end portion of each blade is Xin, and a value of the ratio X at an intermediate position between the outer-diameter-side end portion and the inner-diameter-side end portion is Xc,
at least one of the multiple stages of the rotor blades and the multiple stages of the stator blades is configured to satisfy any one of a first condition of Xout<Xc and Xin<Xc, a second condition of $\alpha \cdot Xc \geq Xin > Xc > Xout$ where $\alpha=1.04$, or a third condition of $Xin<Xc<Xout \leq \beta \cdot Xc$ where $\beta=1.04$.

2. The turbo-molecular pump according to claim 1, wherein
the multiple stages of the stator blades are configured to satisfy any one of six conditions including a fourth condition of Xin<Xout<Xc, a fifth condition of Xin≤Xout<Xc, and a sixth condition of Xout≤Xin<Xc in addition to the first condition, the second condition, and the third condition.

3. The turbo-molecular pump according to claim 2, wherein
the turbo-molecular pump is used for exhausting hydrogen gas.

4. An exhausting method for exhausting hydrogen gas comprising,
a step of exhausting hydrogen gas by using the turbo-molecular pump according to claim 2.

5. The turbo-molecular pump according to claim 1, wherein
the turbo-molecular pump is used for exhausting hydrogen gas.

6. An exhausting method for exhausting hydrogen gas comprising,
a step of exhausting hydrogen gas by using the turbo-molecular pump according to claim 1.

7. A turbo-molecular pump comprising;
multiple stages of rotor blades and multiple stages of stator blades are alternately arranged, wherein
each of the rotor blades and the stator blades includes, in a circumferential direction, multiple radially-formed blades in a torsion blade shape having different blade angles between an inner diameter side and an outer diameter side, and
for a ratio $X=S/b$ between an inter-blade distance S as a circumferential interval between adjacent ones of the blades in the circumferential direction and a blade length b as a dimension of an inclined surface of each blade in a width direction, when a value of the ratio X at an outer-diameter-side end portion of each blade is Xout, a value of the ratio X at an inner-diameter-side end portion of each blade is Xin, and a value of the ratio X at an intermediate position between the outer-diameter-side end portion and the inner-diameter-side end portion is Xc,
the multiple stages of the rotor blades and the multiple stages of the stator blades include a rotor blade and a stator blade forming a suction stage, a rotor blade and a stator blade forming an intermediate stage, and a rotor blade and a stator blade forming an exhaust stage, and
the multiple stages of the stator blades are configured to satisfy a first condition of Xin<Xc<Xout at the suction stage,
satisfy a second condition of Xin<Xout<Xc at the intermediate stage, and
satisfy any one of a third condition of $\alpha \cdot Xc \geq Xin > Xc > Xout$ where $\alpha=1.04$, a fourth condition of Xin≤Xout<Xc, or a fifth condition of Xout≤Xin<Xc at the exhaust stage.

8. The turbo-molecular pump according to claim 7, wherein
the turbo-molecular pump is used for exhausting hydrogen gas.

9. An exhausting method for exhausting hydrogen gas comprising,
a step of exhausting hydrogen gas by using the turbo-molecular pump according to claim 7.

* * * * *